United States Patent [19]

Kawasumi et al.

[11] Patent Number: 4,842,828
[45] Date of Patent: Jun. 27, 1989

[54] APPARATUS FOR TREATING SURFACE OF OBJECT WITH ULTRAVIOLET RAYS AND REACTION GAS

[75] Inventors: Ken-ichi Kawasumi, Ome; Akio Inada, Tokyo, both of Japan

[73] Assignee: Hitachi, Ltd., Tokyo, Japan

[21] Appl. No.: 148,897

[22] Filed: Jan. 27, 1988

[30] Foreign Application Priority Data

Feb. 18, 1987 [JP] Japan .................................. 62-33251

[51] Int. Cl.⁴ .................................................. B01J 19/12
[52] U.S. Cl. .............................. 422/186.3; 422/186.05
[58] Field of Search ........... 422/186.3, 186.05, 186.06, 422/186, 186.04, 186.26, 905, 907; 204/199; 118/641; 427/54.1

[56] References Cited

U.S. PATENT DOCUMENTS

| | | | |
|---|---|---|---|
| 4,209,357 | 6/1980 | Gorin et al. .............. | 422/186.05 X |
| 4,297,162 | 10/1981 | Mundt et al. .............. | 422/186.05 X |
| 4,307,283 | 12/1981 | Zajac .......................... | 422/186.05 X |
| 4,516,527 | 5/1985 | Sugioka ....................... | 422/186.3 X |

FOREIGN PATENT DOCUMENTS

| | | | |
|---|---|---|---|
| 0065436 | 5/1980 | Japan ........................... | 422/186.05 |
| 0059450 | 4/1984 | Japan ........................... | 422/186.3 |
| 60-129136 | 7/1985 | Japan . | |
| 0223127 | 11/1985 | Japan ........................... | 422/906 |

Primary Examiner—John F. Terapane
Assistant Examiner—Susan Wolffe
Attorney, Agent, or Firm—Fay, Sharpe, Beall, Fagan, Minnich & McKee

[57] ABSTRACT

A surface treatment apparatus for treating the surface of a substrate that is supported on a rotating table. The apparatus has a plate transmissive of ultraviolet rays that is mounted in parallel with the substrate. The plate has a plurality of supply nozzles for supplying a reactive gas to the rotating substrate surface, the nozzles being provided at positions of different radius of rotation in order to complete the surface treatment in a short period of time.

6 Claims, 1 Drawing Sheet

APPARATUS FOR TREATING SURFACE OF OBJECT WITH ULTRAVIOLET RAYS AND REACTION GAS

BACKGROUND OF THE INVENTION

The present invention relates to a surface treatment apparatus, and more particularly to a means for supplying a reactive gas for removal of resist, etc. from a substrate.

Prior apparatus of this type have been constructed to supply the reactive gas only from one lateral direction, as seen in Japanese patent application Kokai (Laid-Open) No. 129,136/85.

Since the reactive gas was supplied from one direction, the above-mentioned prior apparatus is disadvantageous in that, although areas close to the supply nozzle directly exposed to the fresh gas are treated rapidly, areas far distant from the supply nozzle cannot be treated rapidly and therefore the whole surface cannot be treated uniformly in a short period of time.

SUMMARY OF THE INVENTION

The object of the present invention is to provide a surface treatment apparatus wherein the time period of surface treatment can be shortened.

The above-mentioned object of the invention can be achieved by nearly uniformly supplying a fresh reactive gas to the whole surface of substrate.

That is to say, by flowing a reactive gas onto a rotating substrate surface from plural positions distant from the center of rotation and not uni-circularly located around the center of rotation of the substrate, fresh reactive gas can be supplied to the whole surface nearly uniformly and therefore a uniform surface treatment can be achieved in a short period of time.

DESCRIPTION OF THE PREFERRED EMBODIMENTS

According to the principle of the invention, if ultraviolet radiation and ozone, for example, are supplied to the surface of a substrate coated with an organic polymer, the chemical bondings of the organic polymer are broken by the ultraviolet rays. Further, the supplied ozone is converted to an oxygen radical, which combines with carbon, hydrogen and oxygen atoms constituting the organic polymer to form gases. Thus, owing to volatilization of the gases, the organic polymer is dissolved and removed. In the present invention, rotation of the substrate surface makes the illuminance of the ultraviolet radiation lamp even on the substrate surface over time and allows fresh reactive gas to be projected onto a broadened area of the substrate surface. Further, the supply nozzles of reactive gas are provided at several discrete positions not uni-circularly located around the center of rotation, for projecting fresh reactive gas onto a broadened area of the substrate surface.

As used herein, the term "fresh reactive gas" means oxygen radicals formed from the supplied ozone which collide with the fresh substrate surface to enhance the efficiency of removal of the resist. Although the efficiency is somewhat low in the neighborhood of the supply nozzle because the surface is cooled by the gas, efficiency of removal is sufficiently high in the areas just outside it. In the areas far distant from the supply nozzle, the efficiency of removal is lower because of the lowered concentration of ozone and the disturbance caused by the volatilized gas. Accordingly, a uniform treatment of the substrate surface cannot be realized in a short period of time with a single supply nozzle. Further, in the areas just underneath the supply nozzles, the treatment takes a longer period of time because of a cooling effect produced on the substrate surface.

If plural supply nozzles are provided and the reactive gas is supplied from all the supply nozzles simultaneously, the gas flows collide with one another at some positions of the substrate surface, and the treatment takes a somewhat longer period of time. If plural supply nozzles are provided and the gas is supplied to respective nozzles so as to make time gaps from one to another in a short time cycle, the reverse effects due to the cooling effect just under the supply nozzles and the collision of gas flows can be eliminated. Accordingly, a uniform treatment can be achieved in a very short period of time. Further, this is advantageous in that, by varying the cycle, period and feeding rate of the reactive gas to the supply nozzles in accordance with the surface area of the substrate being treated, surface temperature and properties of organic polymer, optimum conditions of treatment can be determined and one apparatus can be used for many purposes.

Figure 1:
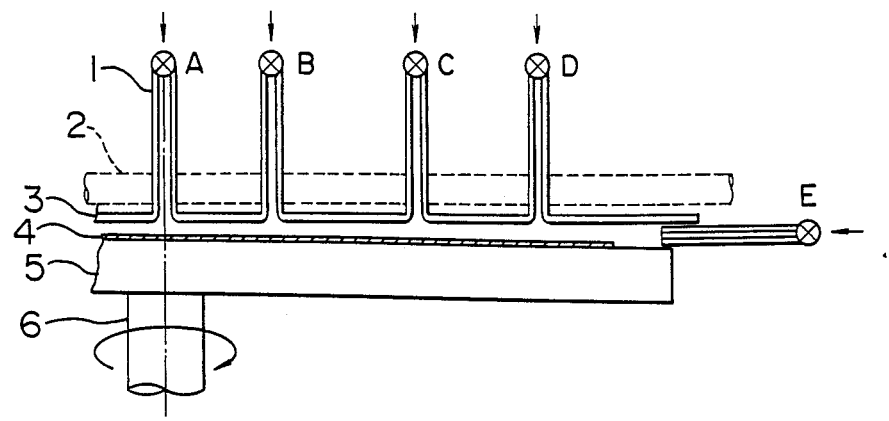
FIG. 1 is an outlined vertical sectional view of main parts of the apparatus in one example of the invention.

Next, one embodiment of the present invention will be illustrated with reference to FIGS. 1 and 2.

First, construction of this embodiment will be illustrated with reference to FIG. 1. A synthetic quartz glass plate 3 having a thickness of 2.5 mm and transmitting ultraviolet rays is placed under an ultraviolet radiation source 2 closely to the light source, in parallel with the surface of substrate 4 having a diameter of 125 mm, and so as to form a gap of, for example, 2 mm. The glass plate 3 is provided with nozzles 1 (A, B, C, D) supplying an ozone-containing oxygen gas to positions having a radius of rotation of 0, 15, 35 and 52.5 mm, respectively, on the surface of substrate 4 and additionally with a lateral nozzle E. The lateral nozzle E is not essential, but is included in the preferred embodiment. The rotating table 5 on which substrate 4 is mounted has a rotating shaft 6 and includes a heater (not shown in the drawing) for heating the substrate 4. The ultraviolet radiation source 2 has, for example, twelve low pressure mercury vapor lamps having a tube diameter of 9 mm, made of synthetic quartz glass, and placed on one plane at intervals of 13 mm.

Figure 2:
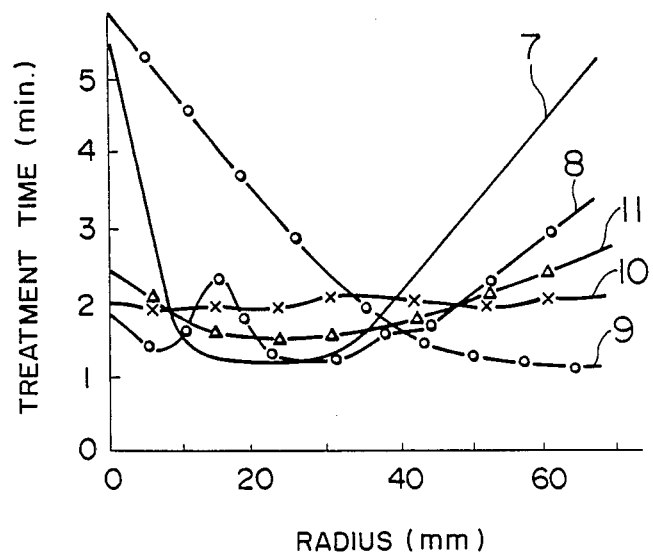
FIG. 2 is a graph illustrating the surface treatment time distribution in one example of the invention.

FIG. 2 illustrates the time distribution of removal of resist having a thickness of 1 micron which was measured while the ozone concentration, flow mass of ozone, illuminance of ultraviolet radiation, temperature of substrate 4 and its revolutions per unit time were fixed and the supplying method of the reactive gas was varied.

In FIG. 2, curve 7 illustrates the time distribution of removal of resist from the surface of substrate 4 in an experiment wherein the reactive gas was supplied only from nozzle A. Simiarly, curve 8 illustrates the resist removal time in an experiment wherein the reactive gas was supplied only from nozzle B; curve 9 illustrates the resist removal time distribution when the gas was supplied only from nozzle E; curve 10 illustrates the resist removal time distribution in an experiment wherein the reactive gas was supplied from nozzles B, C and D successively and cyclically; and curve 11 illustrates the resist removal time distribution wherein the reactive gas was supplied from nozzles B and C simultaneously. In curves 7, 8 and 9, a great difference is found between the area treated that is close to the axis of rotation of substrate 4 and the treated are extending outwardly therefrom. The result is uneven. In curves 10 and 11 the result is nearly even over the entire area extending outwardly from the axis; and the treatment is completed in a short period of time.

As is apparent from the examples mentioned above, according to the present invention, a reactive gas is supplied onto the surface of a rotating substrate surface from plural supply nozzles provided at positions of different radius of rotation so as to make appropriate time gaps in the supply of the gas to the substrate surface, whereby the whole surface can be treated nearly uniformly and, as a result, in a short period of time.

The plural supply nozzles may not necessarily be provided on one radial line. Location of all the nozzles on one circle around the center of rotation does not result in a good effect.

Although the use of three supply nozzles B, C and D produces a good result in the above-mentioned example, a similarly good effect can be achieved by providing only two nozzles, too, depending on the size of substrate 4. Supplying the gas through a combination of nozzles B, C and E also exhibits a good effect.

According to the present invention, reactive gas is supplied to the surface of a rotating substrate from plural supply nozzles provided on positions not residing on one circle around the center of rotation, and the timing of supplying the gas is appropriately controlled, whereby the surface of the substrate can be treated in a short period of time. Accordingly, the apparatus of the present invention is particularly well suited to the removal of residual resist from a semiconductor wafer surface or for the washing of a substrate surface.

What is claimed is:

1. A substrate surface treatment apparatus, comprising: means for rotating the substrate about an axis of rotation, plate means transmissive of ultraviolet rays mounted in parallel with the surface of the substrate for forming a predetermined uniform gap between said substrate surface and said plate means, ultraviolet radiation means for irradiating the surface of the substrate through said plate means, said plate means including plural supply nozzles, and means for supplying reactive gas to the surface of said substrate through said plural supply nozzles, each of said nozzles being arranged opposite the substrate surface at positions of different radius of rotation with respect to said axis of rotation.

2. A surface treatment apparatus according to claim 1, wherein said means for supplying includes means for supplying reactive gas periodically through said plural supply nozzles.

3. A surface treatment apparatus according to claim 1, wherein said reactive gas is an ozone-containing oxygen gas.

4. A surface treatment apparatus according to claim 2, wherein said reactive gas is an ozone-containing oxygen gas.

5. A surface treatment apparatus according to claim 1, wherein said rotating table involves a heater.

6. The surface treatment apparatus according to claim 1, wherein said plural supply nozzles are a part of said plate means.

* * * * *